Patented Nov. 1, 1949

2,486,795

UNITED STATES PATENT OFFICE 2,486,795

PREPARATION OF 4-ARYL-4-CARBALKOXY-PIPERIDINES

Hans Kaegi, Basel, and Karl Miescher, Riehen, Switzerland, assignors to Ciba Pharmaceutical Products Inc., Summit, N. J., a corporation No Drawing. Application May 7, 1945, Serial No. 592,536
In Switzerland August 28, 1944

6 Claims. (Cl. 260—294)

It is known that aliphatic α-betaines, but not β- and γ-betaines, can be transposed on heating into dialkylamino acetic acid esters ("Berichte der deutschen chemischen Gesellschaft," vol. 35, page 584). An analogous transformation of the trimethyl-ortho-, -meta or -para-benz-betaines into the corresponding dimethylaminobenzoic acid methyl esters can also be effected ("Berichte der deutschen chemischen Gesellschaft," vol. 6, page 585, and vol. 37, page 401). Such a transformation, however, can not be brought about with heterocyclic compounds, for example, arecaidine-dimethyl-betaine and trigonelline, where decomposition occurs on heating with evolution of gas ("Berichte der deutschen chemischen Gesellschaft," vol. 35, page 584). The conversion of betaines into corresponding esters thus takes place only exceptionally. It had to be regarded as very little promising to subject 4-aryl-piperidine-4-carboxylic acid betaines to this reaction, as it was to be assumed that a considerable decomposition would occur, judging from the state of the art described above.

According to the present invention 4-aryl-piperidine-4-carboxylic acid esters are surprisingly obtained in good yield by heating 4-aryl-piperidine-4-carboxylic acid betaines to a high temperature until rearrangement occurs.

In the starting materials the aryl nucleus may be substituted or unsubstituted, while methyl, ethyl, propyl, allyl, benzyl, phenylethyl and similar groups are attached to the piperidine nitrogen atom. The piperidine nucleus may also contain further substituents.

The transformation of the betaines into the corresponding esters occurs as a rule at 200–250° C. Lower temperatures are also sufficient in some cases. A distillation can also be carried out simultaneously with heating, at ordinary or reduced pressure. The ester which has formed is often distilled off directly, without the betaine having previously melted. The transformation can also be effected in a solvent of high boiling point.

The 4-aryl-piperidine-4-carboxylic acid betaines used as starting materials are formed, for example, by saponifying 4-aryl-4-cyano-piperidinium salts, the manufacture of which is described in application Serial No. 530,742, filed April 12, 1944, now Patent 2,486,792. These piperidinium salts can be easily saponified, for example, with mineral acids. The corresponding betaines are obtained by subsequent treatment with strong alkalies, for example, potassium hydroxide, calcium hydroxide, silver oxide and the like. The course of the reaction starting from 1:1-dimethyl-4-phenyl-4-cyano-piperidinium bromide is explained by the following scheme:

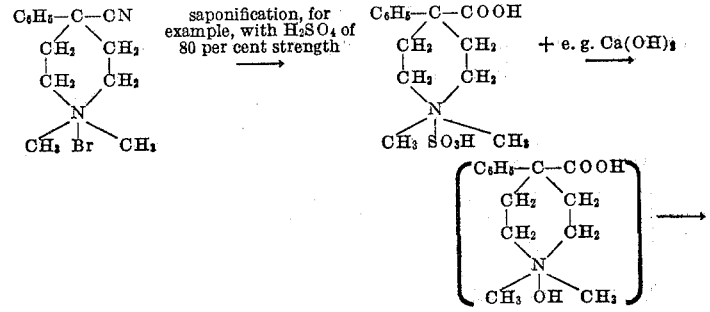

The following examples illustrate the invention, the parts being by weight:

Example 1

21 parts of 1:1-dimethyl-4-phenyl-piperidine-4-carboxylic acid betaine are heated to 250° C. in a fractionating flask in an air-bath by using a water jet vacuum. The betaine does not melt, but distillation occurs directly, a yellow oil being thus obtained which solidifies at room temperature. For the further purification the product may be subjected to a fractional distillation in a high vacuum. There is obtained 1-methyl-4-phenyl-piperidine-4-carboxylic acid methylester. This compound can be recrystallized from hexane and then melts at 62–63.5° C.

The betaine used as starting material is prepared from 1:1-dimethyl-4-phenyl - 4 - cyano - piperidinium bromide obtainable according to the process described in application Serial No. 530,742 from dimethylaminoethyl - benzylcyanide, by saponification with sulfuric acid of 80 per cent strength at 140° C. The sulfuric acid is precipitated with calcium hydroxide, filtered, and the filtrate is evaporated. The remaining 1:1-dimethyl-4-phenyl-piperidine-4-carboxylic acid betaine is a crystalline mass which is easily soluble in water and alcohol and decomposes on heating without a definite melting point.

Instead of with sulfuric acid of 80 per cent strength, the 1:1-dimethyl-4-phenyl - 4 - cyano - piperidinium bromide can also be saponified by boiling with 10-N hydrobromic acid or by heating to 190–200° C. with methyl alcohol solution of caustic potash. In the former case the bromine ion is combined with caustic potash solution after distilling off the hydrobromic acid in excess, in the latter case the caustic potash solution is neutralized with hydrochloric acid or hydrobromic acid and the betaine is separated with alcohol from the salts insoluble therein.

*Example 2*

When using in Example 1 as starting material 1:1-diethyl-4-phenyl-piperidine-4-carboxylic acid betaine, there is obtained by the dry distillation in good yield 1-ethyl-4-phenyl-piperidine-4-carboxylic acid-ethyl ester as an oil boiling at 115–117° C. under 0.07 mm. pressure.

Instead of subjecting the betaine to dry distillation it can also be heated in a solvent of high boiling point until it has passed from the insoluble to the soluble state.

The betaine necessary for the reaction is obtained analogously to Example 1 from diethyl-aminoethyl-benzylcyanide. It is a crystalline mass which is easily soluble in water and alcohol and decomposes on heating without melting.

*Example 3*

When using in Example 1 as starting material 1:1:2-trimethyl-4-phenyl-piperidine-4-carboxylic acid betaine, there is obtained in analogous manner 1:2-dimethyl-4-phenyl-piperidine-4-carboxylic acid-methylester as an oil boiling at 110–112° C. under 0.1 mm. pressure, which forms a hydrochloride of melting point 223° C.

Instead of distilling the betaine, it may also be heated in a solvent of high boiling point, e. g. decaline. After complete dissolution the ester is isolated, for example, by shaking out with dilute acid.

The aforementioned betaine is obtained as a glassy mass by saponification of the 1:1:2-trimethyl-4-phenyl-4-cyano-piperidinium bromide producible itself from dimethyl-aminoethyl-benzylcyanide and propylene-1:2-dibromide.

*Example 4*

1:1-methyl-benzyl-4-phenyl-piperidine-4-carboxylic acid-betaine obtained from 1:1 methyl-benzyl-4-phenyl-4-cyano-piperidinum bromide by saponification as a glassy mass, is heated to 200° C. in a vacuum. The 1-methyl-4-phenyl-piperidine-4-carboxylic acid-benzylester is thereby distilled as an oil which yields a hydrochloride of melting point 171–173° C. In the catalytic hydrogenation 1-methyl-4-phenyl-piperidine-4-carboxylic acid is obtained therefrom. Thus, in the transposition there is not formed the theoretically also possible 1-benzyl-4-phenyl-piperidine-4-carboxylic acid-methylester which would yield 4-phenyl-piperidine-4-carboxylic acid methylester in the hydrogenation.

*Example 5*

1:1-methyl-allyl-4-phenyl-piperidine-4-carboxylic acid-betaine, obtained as a crystalline mass from methylallylaminoethyl-benzylcyanide analogously to Example 1, is heated in a vacuum to 200–250° C. until everything has distilled over. 1-methyl-4-phenyl-piperidine-4-carboxylic acid allylester is thus obtained as an oil boiling at 118–120° C. under 0.05 mm. pressure.

*Example 6*

When heating 1:1-dimethyl-4-para-tolyl-piperidine-4-carboxylic acid-betaine as described in the foregoing Examples, the 1-methyl-4-para-tolyl-piperidine-4-carboxylic acid-methylester is obtained as an oil boiling at 118–120° C. under 0.15 mm. pressure which solidifies on cooling. The betaine used for the transformation is obtained from para-tolylcyanide according to the above mentioned method as a crystalline mass.

*Example 7*

1:1-methyl-ethyl-4-phenyl-piperidine-4-carboxylic acid-betaine obtained from methylethyl-aminoethyl-benzylcyanide according to the above mentioned method as an amorphous mass is rapidly distilled without a vacuum. The 1-ethyl-4-phenyl-piperidine-4-carboxylic acid-methylester can be separated from the distillate by fractionated distillation as a colorless oil boiling at 109° C. under 0.03 mm. pressure. The hydrochloride of the ester melts at 204–205° C.

What we claim is:

1. Process for the manufacture of a 4-aryl-piperidine-4-carboxylic acid ester, comprising heating a 4-aryl-piperidine-4-carboxylic acid betaine to a high temperature until rearrangement occurs, and recovering the 4-aryl-piperidine-4-carboxylic acid ester.

2. Process for the manufacture of a 4-aryl-piperidine-4-carboxylic acid ester, comprising subjecting a 4-aryl-piperidine-4-carboxylic acid betaine to dry distillation, and recovering the 4-aryl-piperidine-4-carboxylic acid ester.

3. Process for the manufacture of a 4-aryl-piperidine-4-carboxylic acid ester, comprising heating a 4-aryl-piperidine-4-carboxylic acid betaine to a high temperature until rearrangement occurs in the presence of a solvent of high boiling point, and recovering the 4-aryl-piperidine-4-carboxylic acid ester.

4. Process for the manufacture of a 4-aryl-piperidine-4-carboxylic acid ester, comprising subjecting a 4-aryl-piperidine-4-carboxylic acid betaine to dry distillation in a vacuum, and recovering the 4-aryl-piperidine-4-carboxylic acid ester.

5. Process for the manufacture of a 4-aryl-piperidine-4-carboxylic acid ester, comprising subjecting 1:1-dimethyl-4-phenyl-piperidine-4-carboxylic acid betaine to dry distillation in a vacuum, and recovering the 4-aryl-piperidine-4-carboxylic acid ester.

6. Process for the manufacture of a 4-aryl-piperidine-4-carboxylic acid ester, comprising subjecting 1:1-methyl-ethyl-4-phenyl-piperidine-4-carboxylic acid betaine to dry distillation, and recovering the 4-aryl-piperidine-4-carboxylic acid ester.

HANS KAEGI.
KARL MIESCHER.

REFERENCES CITED

The following references are of record in the file of this patent:

UNITED STATES PATENTS

| Number | Name | Date |
|---|---|---|
| 2,129,264 | Downing et al. | Sept. 6, 1938 |
| 2,217,846 | Arthner et al. | Oct. 15, 1940 |
| 2,310,109 | Neu | Feb. 2, 1943 |
| 2,413,615 | Fox | Dec. 31, 1946 |

FOREIGN PATENTS

| Number | Country | Date |
|---|---|---|
| 344,029 | Germany | Nov. 12, 1921 |
| 463,578 | Germany | July 31, 1928 |

Certificate of Correction

Patent No. 2,486,795 — November 1, 1949

HANS KAEGI ET AL.

It is hereby certified that errors appear in the printed specification of the above numbered patent requiring correction as follows:

Column 1, line 46, for "piperidine" read *piperidino*; column 3, line 48, for "piperidinum" read *piperidinium*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*